United States Patent [19]

Nagy

[11] Patent Number: 5,086,958
[45] Date of Patent: Feb. 11, 1992

[54] VEHICULAR ACCESSORY MOUNTING ORGANIZATION

[76] Inventor: Giselle Nagy, 7556 Hesperia Ave., Reseda, Calif. 91335

[21] Appl. No.: 578,686

[22] Filed: Sep. 7, 1990

Related U.S. Application Data

[63] Continuation-in-part of Ser. No. 371,841, Jun. 27, 1989, Pat. No. 5,048,733.

[51] Int. Cl.$^5$ .............................................. B60R 7/00
[52] U.S. Cl. ........................... 224/42.42; 224/42.45 R; 224/277; 248/223.4; 248/311.2
[58] Field of Search ............. 224/281, 42.42, 42.45 R, 224/42.43, 277, 42.01; 248/223.4, 311.2; 219/266, 267, 265; 108/44

[56] References Cited

U.S. PATENT DOCUMENTS

| | | | |
|---|---|---|---|
| 488,851 | 12/1892 | Stock | 248/223.4 |
| 1,855,009 | 4/1932 | Clegg | 248/313 |
| 4,724,986 | 2/1988 | Kahn | 224/42.42 |
| 4,877,164 | 10/1989 | Baucom | 224/42.44 |

Primary Examiner—Linda J. Sholl
Attorney, Agent, or Firm—Leon Gilden

[57] ABSTRACT

An apparatus for use in combination with vehicular cigarette lighter sockets, wherein the apparatus includes a cylindrical base including spring biased clip members to retain the cylindrical base within the cigarette lighter socket. The base is secured to a generally "Z" shaped link to define an offset forward leg mounting a first head rotatably mounted to a second head, wherein the second head is in turn mounted to a third head and the third head mounted to a fourth head, the fourth head mounting a support plate thereon, wherein the support plate includes a generally trapezoidal slot to receive trapezoidal flanges of accessories of the organization to include a cup, a clip board organization, and a tray assembly.

9 Claims, 4 Drawing Sheets

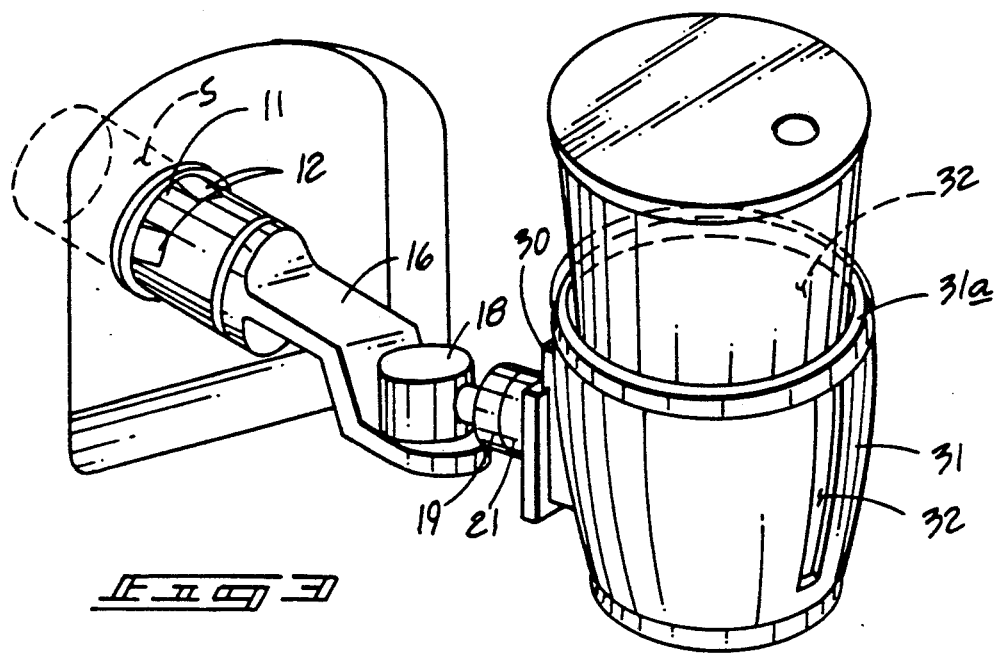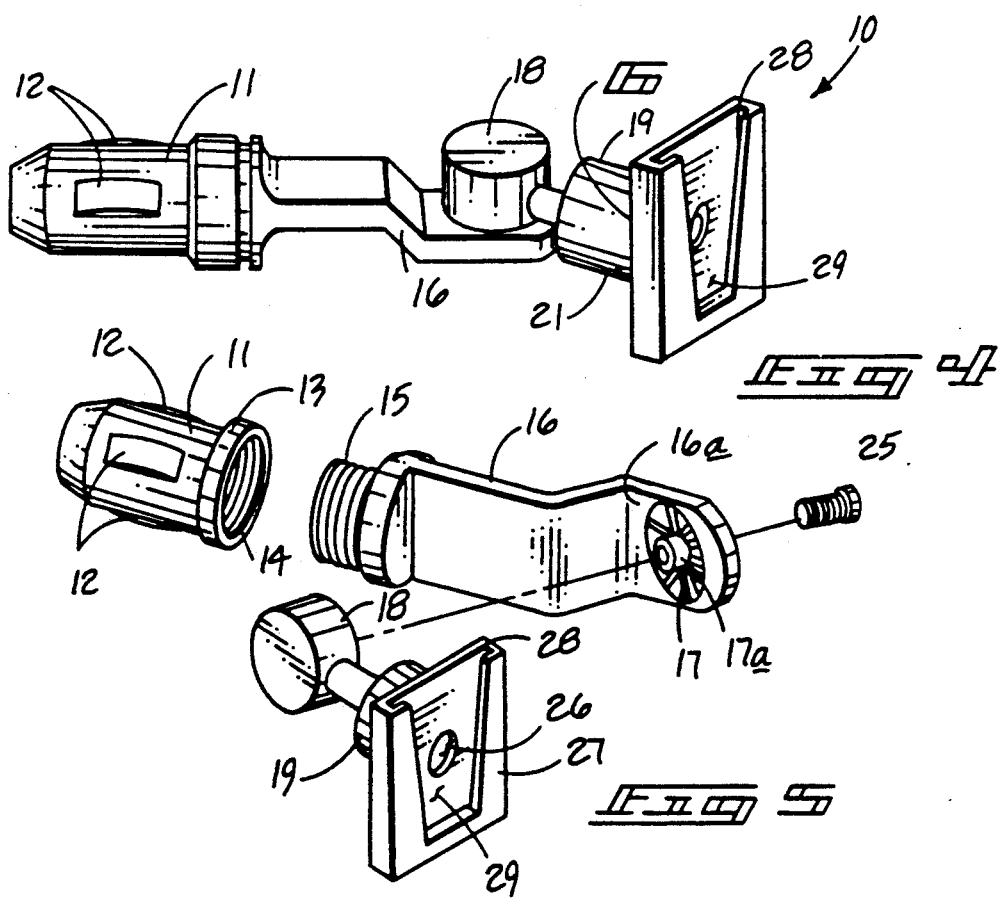

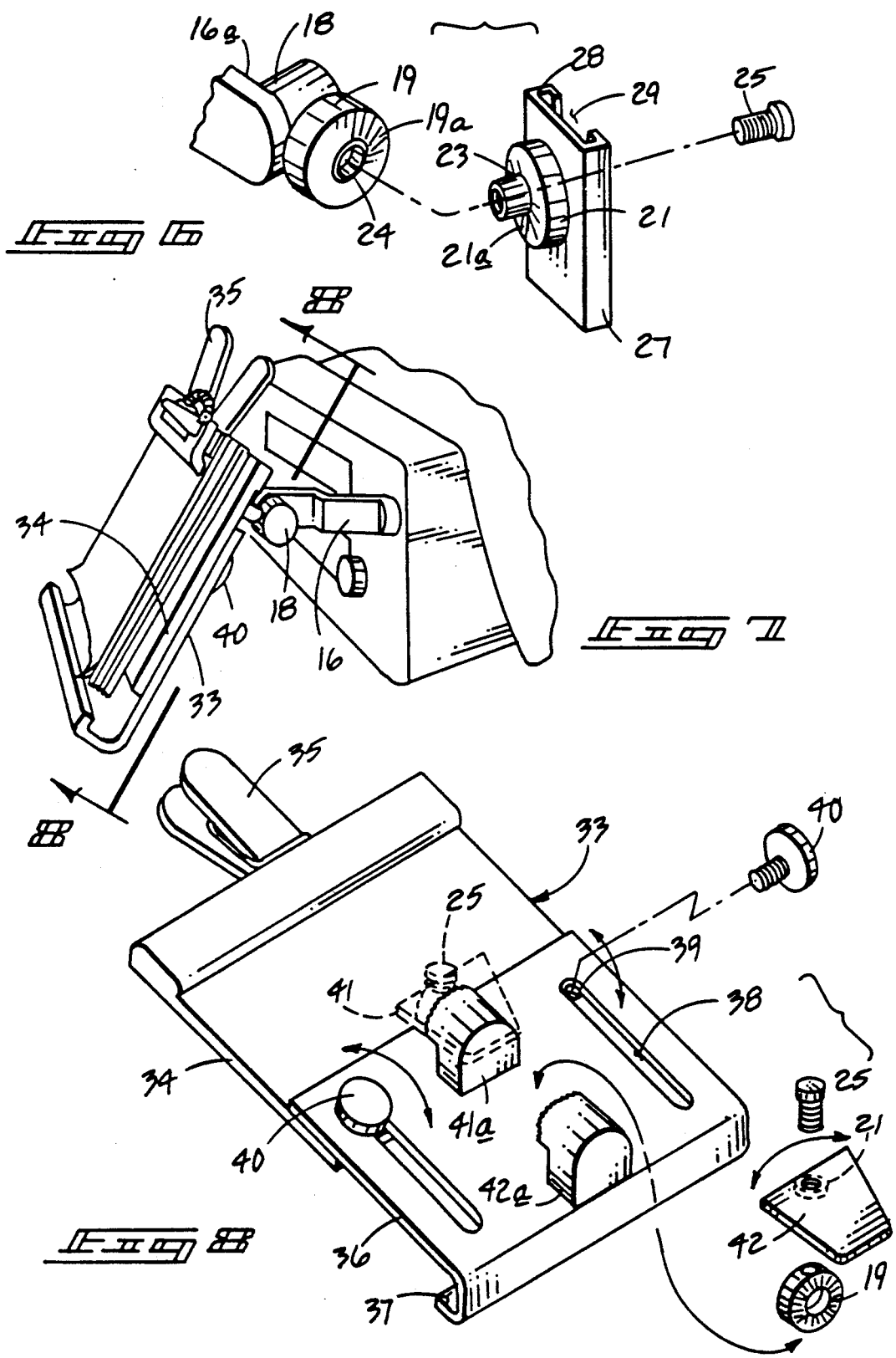

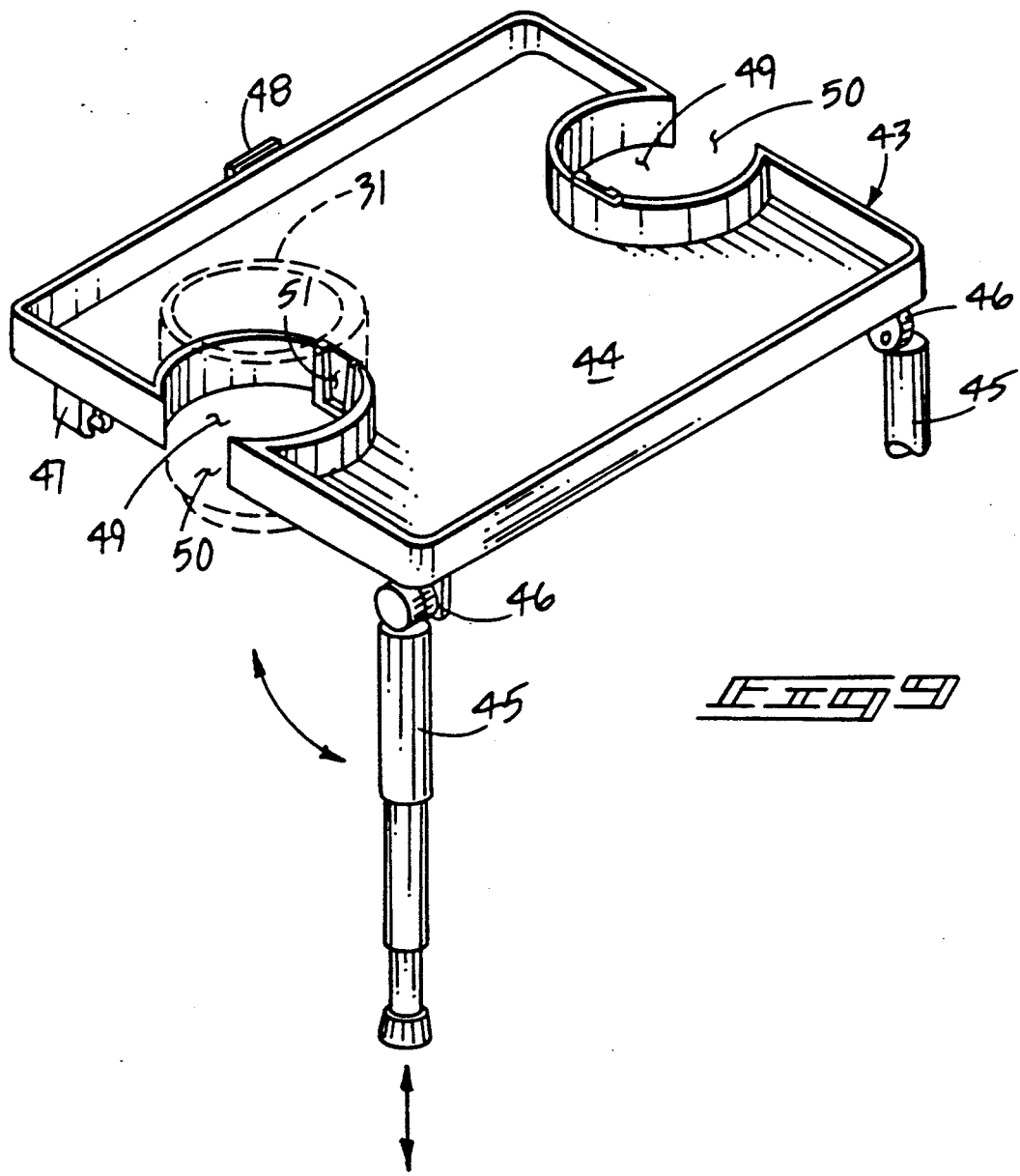

VEHICULAR ACCESSORY MOUNTING ORGANIZATION

RELATED APPLICATIONS

This application is a continuation in part of co-pending application Ser. No. 07/371,841, filed Jun. 27, 1989 now U.S. Pat. No. 5,048,733.

BACKGROUND OF THE INVENTION

1. Field of the Invention

The field of invention relates to accessory organizations for use with motorized vehicles, and more particularly pertains to a new and improved vehicular accessory mounting organization wherein the same permits structural association of various accessory items in cooperation with a cigarette lighter socket of a motorized vehicle.

2. Description of the Prior Art

Accessory organizations for convenience of drivers of various motorized vehicles is known in the prior art to effect convenience and enhance the ability of such a driver to exercise accessory functions in addition to control of a motorized vehicle. Frequently during traverse of various geographic locations, a driver is in need of support accessories such as cup holders, writing surfaces, and the like. The instant invention sets forth an organization to accommodate driver need and permits the organization to functionally accommodate various configurations of automative environments. Examples of prior art devices include U.S. Pat. No. 3,842,281 to Limbert providing a beverage mount that is pivotally mounted to a shank that in turn is secured relative to a vertical support such as a window and the like.

U.S. Pat. No. 4,724,986 to Kahn provides a beverage receptacle holder for mounting to an interior of a passenger vehicle, wherein the same is mounted to a cigarette lighter receptacle and a forward surface of the dashboard by an accumulated linkage arrangement of a relatively complex and remote organization to that of the instant invention to enable securement of a single beverage containing support.

U.S. Pat. No. 4,294,384 to Howell sets forth a liquid dispenser formed with a surrounding cradle for securement interiorly of a vehicle.

U.S. Pat. No. 4,303,109 to Cohen provides a beverage containing support that is mounted by means of securement legs to an upper and forward surface of an associated dashboard of a vehicle.

U.S. Pat. No. 4,535,923 to Manke provides an automotive beverage holding device for clipping onto a forward portion of an ash tray or glove compartment door when such door is fully opened.

As such, it may be appreciated that there continues to be a need for a new and improved vehicular accessory mounting organization enabling securement of a variety of accessory support structure to be utilized in vehicular travel and in this respect, the present invention substantially fulfills this need.

SUMMARY OF THE INVENTION

In view of the foregoing disadvantages inherent in the known types of automotive accessory equipment now present in the prior art, the present invention provides a vehicular accessory mounting organization wherein the same utilizes an articulate linkage to permit positioning and support of various vehicular accessory items within an automotive environment. As such, the general purpose of the present invention, which will be described subsequently in greater detail, is to provide a new and improved vehicular accessory mounting organization which has all the advantages of the prior art vehicular accessory mounts and none of the disadvantages.

To attain this, the present invention provides an apparatus for use in combination with vehicular cigarette lighter sockets, wherein the apparatus includes a cylindrical base including spring biased clip members to retain the cylindrical base within the cigarette lighter socket. The base is secured to a generally "Z" shaped link to define an offset forward leg mounting a first head rotatably mounted to a second head, wherein the second head is in turn mounted to a third head and the third head mounted to a fourth head, the fourth head mounting a support plate thereon, wherein the support plate includes a generally trapezoidal slot to receive trapezoidal flanges of accessories of the organization to include a cup, a clip board organization, and a tray assembly.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular accessory mounting organization which has all the advantages of the prior art vehicular accessory mounts and none of the disadvantages.

It is another object of the present invention to provide a new and improved vehicular accessory mounting organization which may be easily and efficiently manufactured and marketed.

It is a further object of the present invention to provide a new and improved vehicular accessory mounting organization which is of a durable and reliable construction.

An even further object of the present invention is to provide a new and improved vehicular accessory mounting organization which is susceptible of a low cost of manufacture with regard to both materials and labor, and which accordingly is then susceptible of low prices of sale to the consuming public, thereby making such vehicular accessory mounting organizations economically available to the buying public.

Still yet another object of the present invention is to provide a new and improved vehicular accessory mounting organization which provides in the apparatuses and methods of the prior art some of the advantages thereof, while simultaneously overcoming some of the disadvantages normally associated therewith.

Still another object of the present invention is to provide a new and improved vehicular accessory mounting organization wherein the same permits securement and geometric positioning of the organization relative to various automotive interior environments.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration, somewhat enlarged, of section 3 as set forth in FIG. 1.

FIG. 4 is an isometric illustration of the vehicular mount of the instant invention.

FIG. 5 is an isometric illustration, somewhat exploded, of the vehicular mount of the instant invention.

FIG. 6 is an isometric illustration, somewhat exploded, of portion 6 as set forth in FIG. 4.

FIG. 7 is an isometric illustration of a clip board arrangement utilized by the instant invention.

FIG. 8 is an isometric illustration of the clip board arrangement as illustrated in FIG. 7.

FIG. 9 is an isometric illustration of a tray structure utilized by the instant invention.

DESCRIPTION OF THE PREFERRED EMBODIMENT

Figure 1:
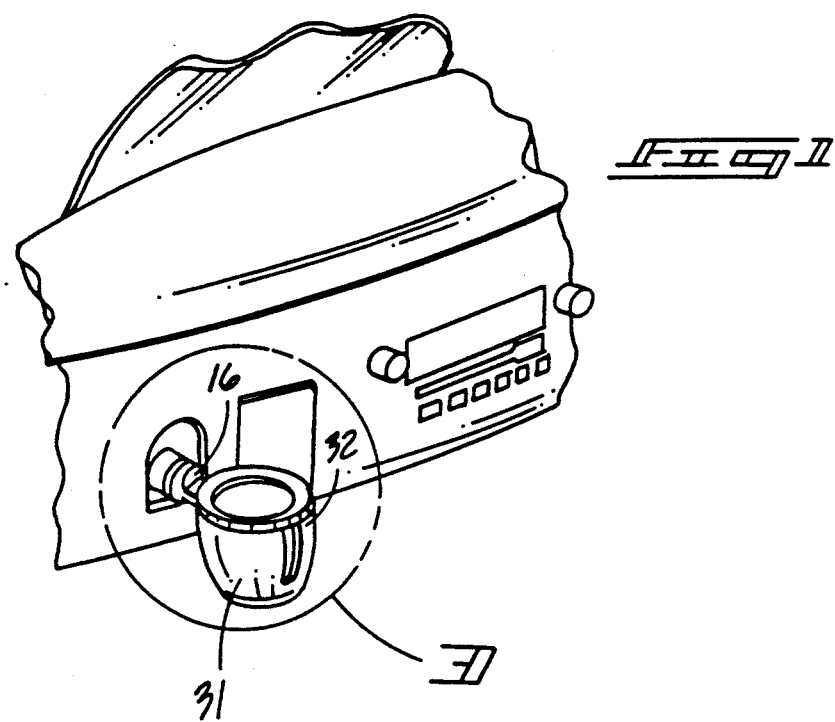
FIG. 1 is an isometric illustration of a cup member of the instant organization mounted to a cigarette lighter socket within a vehicular environment.

With reference now to the drawings, and in particular to FIGS. 1 to 9 thereof, a new and improved vehicular accessory mounting organization embodying the principles and concepts of the present invention and generally designated by the reference numerals 10 through 42 will be described.

More specifically, the vehicular accessory mounting organization 10 of the instant invention essentially comprises a support cylinder 11, including an enlarged forward annular rim 13, wherein the support cylinder 11 includes a series of arcuate spring clip members 12 biased exteriorly of the exterior surface of the support cylinder 11 to secure the support cylinder 11 within an associated cigarette lighter socket "S", as illustrated in FIG. 3 for example. The support cylinder 11 includes an internally threaded cavity 14 coaxially aligned with the support cylinder to receive a threaded boss 15 integrally and longitudinally aligned with a generally "Z" shaped link 16. The "Z" shaped link 16 includes a forward leg 16a offset relative to the axis of the threaded boss 15, including a series of first radially teeth 17 mounted about a first alignment boss 17a. The first radially teeth 17 cooperate with complementary radial teeth mounted to a first mounting head 18 to permit relative rotation of the first mounting head 18 relative to the forward leg 16a. The forward leg 16a and the first mounting head 18 are rotatable relative to one another in a manner as illustrated in FIG. 6 relative to a second and third respective mounting head 19 and 21. The first alignment boss 17a is receivable within a socket and includes a first threaded fastener 25 directed through the first mounting boss 15 to coaxial alignment with the first mounting head 18. A captured spring (not shown) biases the third mounting head 21 into engagement with the second mounting head 19. The second mounting head 19 includes a second mounting head axis orthogonally oriented relative to the axis defined by the first mounting head 18, and includes a set of second mounting head radial teeth 20 cooperative with a complementarily formed array of third mounting head radial teeth 21a mounted and formed to the third mounting head 21, in a manner as illustrated in FIG. 6. The radial teeth are preferably of a trapezoidal cross-sectional configuration to minimize slippage, but may be of any suitable cross-sectional configuration such as triangular, elliptical, and the like. A second threaded fastener 26 is directed through a second alignment boss 23 to receive a second threaded fastener 26 through the second alignment boss 23 and received within the second mounting head cylindrical cavity 24, including a complementarily internally threaded housing to receive the second threaded fastener 26 to permit relative rotation of the third mounting head 21 relative to the second mounting head 19. A longitudinally aligned support plate 27 is orthogonally mounted relative to the axis of the third mounting head 21, and includes a trapezoidal cavity 29 directed through a forward face of the support plate 27, with a trapezoidal slot 28 formed about a perimeter of the trapezoidal cavity. The trapezoidal slot 28 receives a trapezoidal mounting plate 30 formed to a cup member 31. The cup member further includes at least one elongate slot 32 and preferably a plurality of radially displaced elongate slots 32 to receive a handle member of a conventional drinking cup positioned within the cup member 31. It is desired that at least one of the slots 32 be oriented in an aligned, diametrically opposed, relationship to the mounting plate 30, with the second slot oriented to the right of and 90 degrees relative to the first slot to provide a plurality of positions to a cup handle (not shown). Further, a circumferential flexible polymeric retainer ring 31a is mounted coextensively about an upper edge of the cup member 31a to frictionally retain a drinking cup therein.

Figure 2:
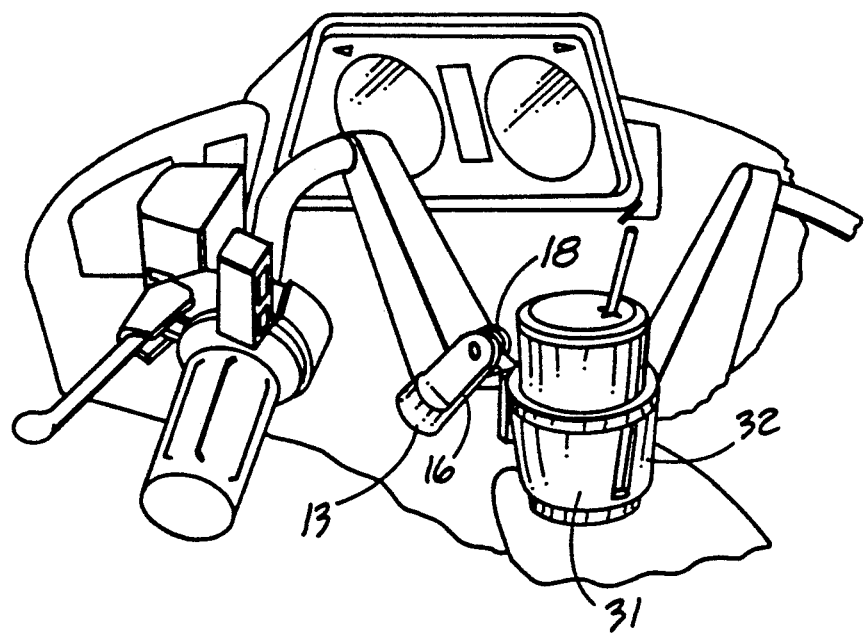
FIG. 2 is an isometric illustration of the cup structure mounted to a cigarette lighter socket within a motorcycle structure.

It may be appreciated therefore that the first mounting head 18, as well as the second and third mounting heads 19 and 21, permit articulation of the cup member 31, in a manner as dictated by interior configuration of a motor vehicle in a manner as illustrated in FIG. 1 for example, and may be further utilized in a motorcycle in a manner as illustrated in FIG. 2.

FIGS. 7 and 8 illustrate the organization utilizing a clip board member 33 mounted to the "Z" shaped link 16, wherein the clip board member includes a first plate 34 relatively and longitudinally displaceable relative to a second clip board plate 36. A spring clip member 35 is operatively and fixedly mounted to an upper end of the first clip board plate 34 for securement of various sheet-like members to a forward surface of the first clip board plate 34. The second clip board plate 36 is of a generally of a "J" shaped configuration, in a manner as illustrated in FIG. 8, to define a "U" shaped channel 37 to receive and position the sheet-like members therewithin when mounted to the forward face of the first clip board plate 34. The second clip board plate 36 includes a plurality of parallel and longitudinally aligned enclosed slots 38 formed through the second clip board plate 36 to each receive a threaded fastener 40 with an enlarged head defined by a diameter greater than that of the defined width of each of the slots, and wherein each threaded fastener is receivable within a threaded first plate bore 39. It is understood that the predetermined length of each of the threaded shanks of each of the threaded fasteners 40 is of a length substantially equal to the sum of the thicknesses of each of the first and second clip board plates combined to prevent projection of each threaded shank through the forward surface of the first clip board plate 34. In this manner, loosening of the threaded fasteners permits longitudinal alignment of the second clip board plate 36 relative to the first clip board 34 to accommodate various sheets of various lengths. The second clip board plate 36 has integrally mounted thereto on a rear surface thereof, an upper and lower wedge plate 41 and 42 rotatably mounted upon a respective upper and lower support mount 41a and 42a. Each respective wedge plate is selectively receivable within the support plate 27 and the associated trapezoidal slot 28, and accordingly each wedge plate 41 and 42 is of a complementary configuration to that defined by the trapezoidal slot 28 to align and secure the clip board relative to the support plate 27, as illustrated in FIG. 7 for example. Further, the upper and lower wedge plates 41 and 42 are positioned medially between the longitudinal slots 38 at respective upper and lower ends of the second clip board plate 36. Angular rotational adjustment of the clip board member 33 relative to the support plate 27 is provided.

As illustrated, each wedge plate includes a third mounting head 21 rotatably and adjustably mounted to the lower generally "L" shaped support mount that includes a second mounting head 19 securable together by a fastener in a manner as set forth regarding the adjustable arrangement depicted in FIG. 6. A fastener or integral casting secures each wedge plate relative to an associated mounting head. Rotation of the wedge plate 42 defines a cylinder whose axis is inclined as parallel to the clip board plate 36.

FIG. 9 illustrates the use of a tray member 43 in cooperation with the instant invention and selectively mounted to the support plate 27 by an associated wedge support plate 48 mounted to a rear end of the tray member 43. The tray member 43 includes a planar support surface 43 and a perimeter wall mounted about the support surface, with a cylindrical recess 49 projecting through each side of the planar surface 44, wherein each planar surface includes an associated trapezoidal slot 51 to receive a respective trapezoidal mounting 30 of a cup member 31, in a manner as illustrated in FIG. 9 in phantom. The cup members 31 may project forwardly through a slot opening 50 of each cylindrical recess 49. The tray member 43 further includes a pair of telescoping legs 45 utilizing pivot mounts 46 to mount each of the telescoping legs 45 to a forward corner portion of the tray member 43, wherein the telescoping legs 45 are each receivable within a respective spring biased "U" shaped leg clip 47 mounted to each rear corner portion of the tray member on a bottom surface thereof longitudinally aligned with each pivot mount 46 and associated telescoping leg 45.

Accordingly, it may be appreciated that the mounting arrangement in the organization of the instant invention provides a plurality of accessory items that may be mounted within the support plate 27 of the link 16 and positionable and articulated to a desired orientation within a particular vehicular environment.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular accessory mounting organization for securement within an automotive cigarette lighter socket within a vehicular dashboard, wherein the socket is defined by a socket bore of a predetermined internal configuration, and wherein the apparatus comprises, an elongate support cylinder defined by an external predetermined configuration substantially equal to the predetermined internal configuration of the socket, and a plurality of spring clip members extending exteriorly of the exterior surface defined by the support cylinder, and a link member mounted to the support cylinder, and the forward leg including a series of first radial teeth mounted thereon, the first radial teeth cooperative with second radial teeth, the second radial teeth integrally mounted to a first mounting head, the first mounting head rotatably positionable relative to the forward leg and including a fastener member directed through the forward leg and receivable within the first mounting head to selectively secure the first mounting head relative to the forward leg, and a second mounting head fixedly mounted to the first mounting head, wherein the second mounting head includes a second mounting head axis and the first mounting head is defined by a first mounting head axis, wherein the second mounting head axis is obliquely arranged relative to the first mounting head axis, wherein the second mounting includes second radial teeth formed thereon, and including a third mounting head, the third mounting head including third mounting head radial teeth, wherein the third mounting head radial teeth are cooperatively securable to the second mounting head radial teeth to rotatably align the second mounting head relative to the third mounting head, and a further fastener directed through the third mounting head to selectively secure the third mounting head relative to the second mounting head, and a support plate integrally mounted to the third mounting head, wherein the support plate includes a support plate cavity and the support plate cavity including a perimeter slot formed about a perimeter of the cavity, and the slot arranged to receive one of a plurality of wedge shaped plates to secure selectively one of said wedge shaped plates within the perimeter slot.

2. An apparatus as set forth in claim 1 wherein at least one of said wedge shaped plates is rotatably mounted to a second clip board plate, wherein the second clip board plate is slidably mounted to a first clip board plate.

3. An apparatus as set forth in claim 2 wherein the second clip board plate includes a plurality of wedge shaped plates mounted medially of a rear surface of the second clip board plate, the second clip board plate includes a plurality of longitudinally aligned and parallel enclosed slots formed through-extending the second clip board plate, wherein the wedge shaped plates are positioned medially of the enclosed slots, and the first clip board plate including a plurality of threaded bores, wherein each of said threaded bores is respectively aligned with a single longitudinal enclosed slot, and a threaded fastener is directed through each of the slots into a respective threaded bore, whereupon loosening of a respective fastener relative to a respective threaded bore permits sliding adjustment of the second clip board plate relative to the first clip board plate.

4. An apparatus as set forth in claim 3 wherein each slot is defined by a predetermined width, and wherein each threaded fastener includes an enlarged head, wherein the enlarged head is defined by a predetermined diameter greater than the predetermined width.

5. An apparatus as set forth in claim 4 wherein each threaded fastener includes a threaded shank, and the first clip board plate and the second clip board plate define a predetermined thickness, wherein the predetermined thickness is substantially equal to a predetermined length defined by each threaded shank.

6. An apparatus as set forth in claim 5 wherein the first clip board plate includes a spring clip member mounted to an upper edge of the first clip board plate, and the second clip board plate is defined by a generally "J" shaped configuration to define a "U" shaped channel along a lower terminal end of the second clip board plate remote from the clip member.

7. An apparatus as set forth in claim 6 wherein the apparatus further includes a cup member, the cup member includes one of the wedge shaped plates mounted to the cup member, and the cup member includes at least one elongate slot directed longitudinally through an exterior wall of the cup member to permit directing a handle portion of a cup through the elongate slot.

8. An apparatus as set forth in claim 7 wherein the apparatus further includes a tray member, the tray member integrally mounted to one of the wedge shaped plates, and the tray member including a planar support surface, and the planar support surface including cylindrical recesses directed through each lateral side of the support surface, and each cylindrical recess includes a wedge shaped slot to receive a wedge shaped plate and an associated cup member.

9. An apparatus as set forth in claim 8 wherein the tray member includes a telescoping leg mounted adjacent each forward corner of the tray member, and each telescoping leg pivotally mounted to the tray member, and each tray member including a generally "U" shaped leg clip longitudinally aligned with each telescoping leg to secure each telescoping leg in a retracted configuration relative to the tray member.

* * * * *